United States Patent
Casota et al.

(10) Patent No.: US 8,096,055 B2
(45) Date of Patent: Jan. 17, 2012

(54) PENDULUM GUIDE DEVICE FOR A JIGSAW BLADE THAT EXECUTES RECIPROCATING MOTIONS

(75) Inventors: Marcel Casota, Gelterkinden (CH); Jingying Zhao, Zuchwil (CH)

(73) Assignee: Robert Bosch GmbH, Stuttgart (DE)

( * ) Notice: Subject to any disclaimer, the term of this patent is extended or adjusted under 35 U.S.C. 154(b) by 294 days.

(21) Appl. No.: 12/515,435

(22) PCT Filed: Apr. 4, 2008

(86) PCT No.: PCT/EP2008/054070
§ 371 (c)(1),
(2), (4) Date: May 19, 2009

(87) PCT Pub. No.: WO2008/148592
PCT Pub. Date: Dec. 11, 2008

(65) Prior Publication Data
US 2010/0050443 A1   Mar. 4, 2010

(30) Foreign Application Priority Data
Jun. 4, 2007   (DE) .......................... 10 2007 025 967

(51) Int. Cl.
*B23D 51/02* (2006.01)
*B23D 49/10* (2006.01)
(52) U.S. Cl. .......................................... 30/392; 30/394

(58) Field of Classification Search ............. 30/392, 30/393, 394
See application file for complete search history.

(56) References Cited

U.S. PATENT DOCUMENTS

| | | | | |
|---|---|---|---|---|
| 2,775,272 | A * | 12/1956 | Papworth | 30/393 |
| 3,220,446 | A * | 11/1965 | Burkey | 83/168 |
| 4,238,884 | A * | 12/1980 | Walton, II | 30/393 |
| 4,512,078 | A * | 4/1985 | Pfanzer | 30/393 |
| 4,628,605 | A * | 12/1986 | Clowers | 30/393 |
| 4,665,617 | A * | 5/1987 | Maier et al. | 30/374 |
| 5,644,847 | A | 7/1997 | Odendahl et al. | |
| 6,625,892 | B2 * | 9/2003 | Takahashi et al. | 30/393 |
| 7,065,884 | B2 * | 6/2006 | Tam et al. | 30/376 |
| 2008/0222901 | A1 * | 9/2008 | Kaiser et al. | 30/392 |
| 2008/0229588 | A1 * | 9/2008 | Casota | 30/290 |

FOREIGN PATENT DOCUMENTS
DE   43 20 233   6/1994
EP   0 736 353   10/1996

* cited by examiner

*Primary Examiner* — Hwei C Payer
(74) *Attorney, Agent, or Firm* — Michael J. Striker

(57) ABSTRACT

A pendulum guide device for a power jigsaw saw blade that executes reciprocating motions includes guide elements that engage a saw blade spine of the saw blade and are associated with a support frame. A first two guide elements is fixed in place on the support frame and a second guide element is bearing-mounted to the support frame in moving fashion and is prestressed in the direction toward the saw blade spine.

6 Claims, 4 Drawing Sheets

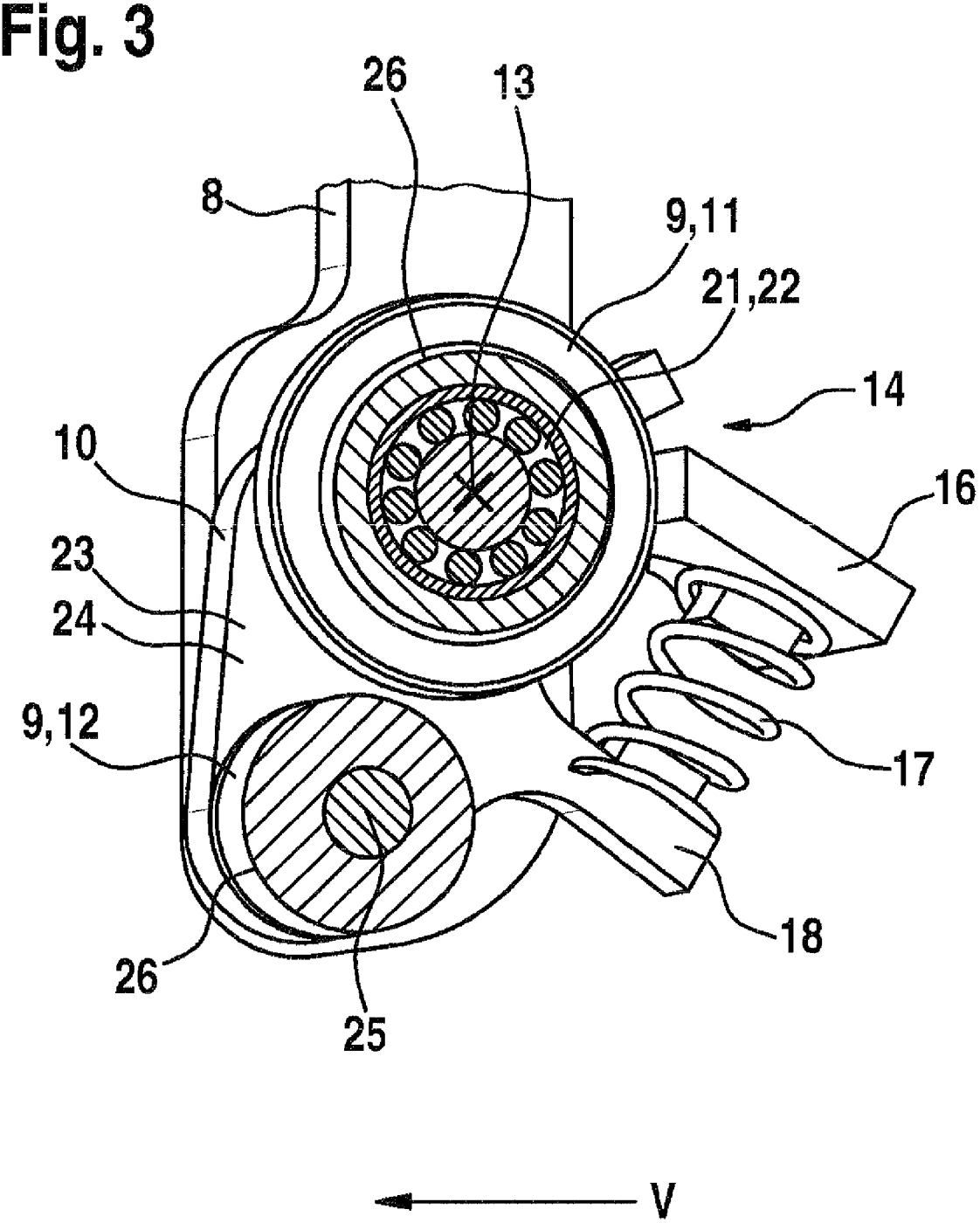

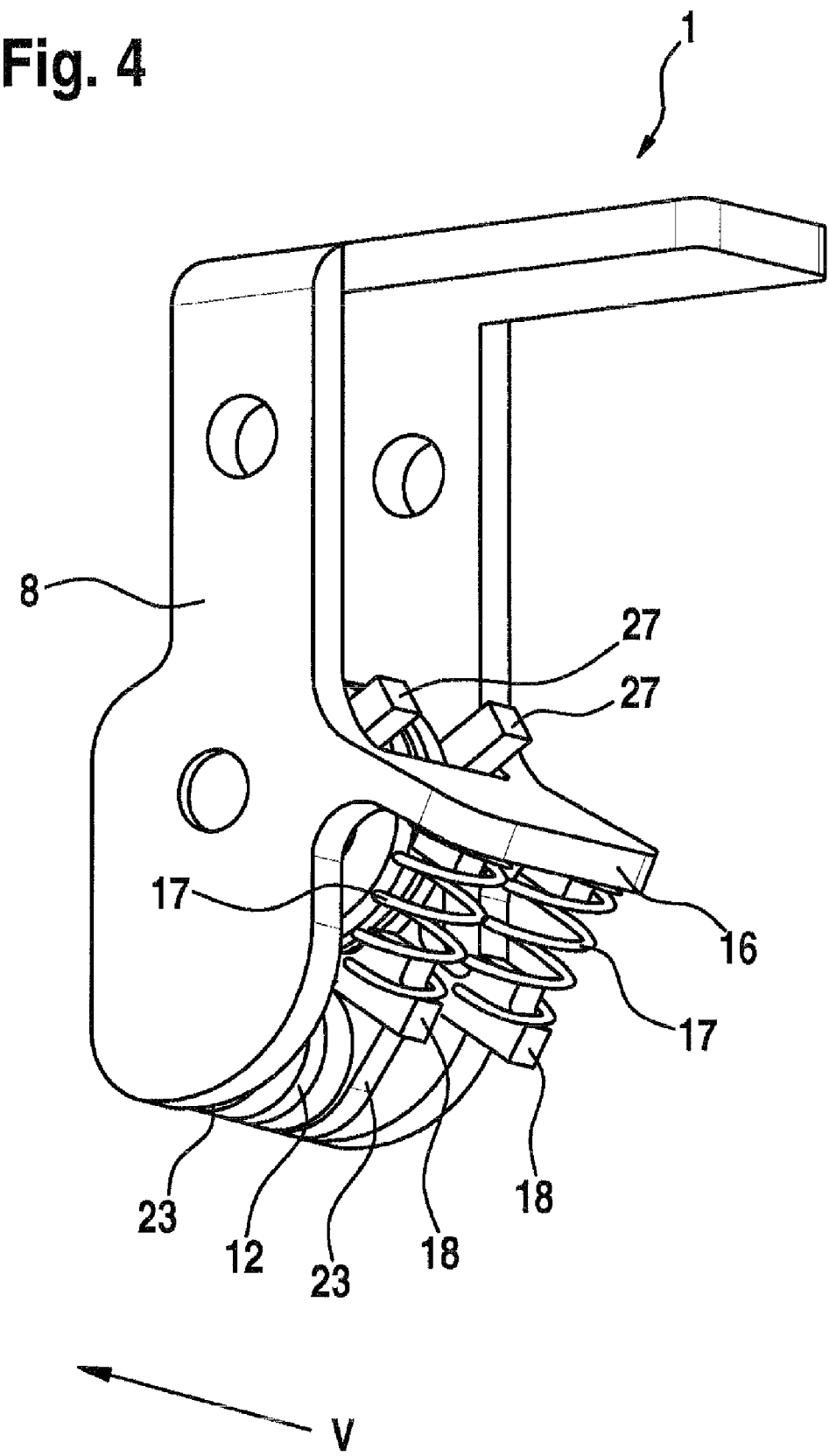

PENDULUM GUIDE DEVICE FOR A JIGSAW BLADE THAT EXECUTES RECIPROCATING MOTIONS

CROSS-REFERENCE

The invention described and claimed hereinbelow is also described in PCT/EP2008/054070, filed on Apr. 4, 2008 and DE 10 2007 025 9672, filed on Jun. 4, 2007. This German Patent Application, whose subject matter is incorporated here by reference, provides the basis for a claim of priority of invention under 35 U.S.C. 119(a)-(d).

The invention relates to a pendulum guide device for a power jigsaw blade that executes reciprocating motions.

BACKGROUND OF THE INVENTION

Power jigsaws with blades that execute reciprocating motions are known, particularly in the form of hand-guided power jigsaws. In them, the lateral guidance and support of the saw blade during the sawing process is largely responsible for the quality of the cut since as it reciprocates in the cut, the saw blade tends to swerve, in particular laterally, away from the resistance presented to it by the material being cut. Viewed in the cutting direction, a lateral deviation of the saw blade from the desired orientation, with the saw blade end moving laterally to the left or right essentially at right angles to the surface of the material being cut, is disadvantageous for the cut quality and saw performance. The mechanical strain due to the bending that this unwanted swerving causes also reduces the service life of the saw blade. The prior art has therefore disclosed pendulum guide devices for such saw blades that execute reciprocating motions. These devices are intended to minimize the free travel distances within which the saw blade is able to deviate during the reciprocating motion. There are conventional embodiments in which the saw blade of power jigsaws is guided by means of a notch in a guide roller or support roller situated between the material being cut and the clamping device in which the saw blade is secured and/or a lateral guidance is provided for the saw blade. There are also known embodiments that provide this lateral guidance additionally or alternatively by means of separate lateral guide jaws in the region directly above the material being cut. In these embodiments, it is disadvantageous that the known saw blade guides do not sufficiently prevent the saw blade from swerving during the reciprocating motion. In these cases, the saw blade itself is deformed in an arc-shaped fashion around the guide element, particularly if only one guide roller is provided between the clamping device and the material being cut, with the one guide element acting as a nodal point with regard to the formation of the arc shape. Particularly in saw blades that execute oscillating motions, this does not assure sufficient guidance of the saw blade in all phases of the oscillating/reciprocating motion. Moreover, the introduction of the oscillating motion into the support element induces considerable strain on the support element and on the spine of the saw blade.

SUMMARY OF THE INVENTION

The object of the invention is to create a pendulum guide device for a power jigsaw blade that executes reciprocating motions, which guide device avoids the above-mentioned disadvantages.

To attain this object, a pendulum guide device for a power jigsaw blade that executes reciprocating motions is proposed, which guide device has guide elements that engage a saw blade spine of the saw blade and that are associated with a support frame. At least two guide elements are provided, one of which is fixed in place on the support frame and the other of which is bearing-mounted to the support frame in moving fashion and prestressed in the direction toward the saw blade spine. At least two guide elements are therefore provided on the support frame. One of these is fixed in place on the support frame while the other is bearing-mounted to the support frame, i.e. is able to execute a movement in relation to the support frame and in so doing, exerts a prestressing force in the direction toward the saw blade spine. The first guide element that is fixed in place on the support frame serves to introduce the oscillating motion of the saw blade, i.e. the production of an impulse, to the saw blade spine essentially perpendicular to the reciprocation direction. In this case, the second guide element, which is prestressed in relation to the saw blade spine, merely serves to provide a lateral guidance of the saw blade, but not to support it and not to introduce the oscillating motion.

In another embodiment, the guide element fixed in place on the support frame is a first guide roller. The use of a first guide roller as a guide element permits the saw blade to roll against it in the course of the reciprocating motion or reciprocating/oscillating motion, thus significantly reducing the friction between the saw blade or saw blade spine and the guide element, namely the first guide roller. This yields a significant reduction in the thermal and mechanical load on both the saw blade and the guide element.

In another embodiment, the guide element fixed in place on the support frame is rotatably mounted to the support frame by means of a bearing. The guide element fixed in place on the support frame is therefore able to execute rotary movements in relation to the support frame.

In a preferred embodiment, the bearing is a needle bearing. Needle bearings can withstand powerful stresses and have a precise guidance, resulting in a smooth guidance of the saw blade, particularly when a load is being exerted on the blade.

In another embodiment, the movably bearing-mounted guide element is a second guide roller. The movably bearing-mounted guide element, which is bearing-mounted to the support frame in a prestressed fashion, is therefore likewise embodied in the form of a roller and in this case is embodied so that it rolls in the course of the reciprocating motion or reciprocating/oscillating motion of the saw blade.

In another preferred embodiment, at least the second guide roller has an essentially V-shaped guide notch on its outer circumference. The V-shaped guide notch assures that in cooperation with its prestressing in the direction of the saw blade spine, the second guide roller always engages the saw blade centrally by means of the saw blade spine since the V-shaped guide notch exerts an automatic centering action on the saw blade spine or more precisely stated, on the shoulders of the saw blade spine.

In a particularly preferred embodiment, the first guide roller has a larger diameter than the second guide roller. The first guide roller serves in particular to introduce the oscillating motion. It exerts an impulse on the saw blade that is executing reciprocating motions; this impulse is exerted in the forward feed direction, essentially transverse to the reciprocating motion. Because the first guide roller here has a relatively large diameter, this impulse introduction—and therefore exertion of stress on both the saw blade spine against which the first guide roller rests and on the first guide roller itself—occurs over a relatively large contact area. This significantly reduces the mechanical strain on both the saw blade spine and also in particular on the first guide roller. The smaller guide roller, which only serves to laterally guide the saw blade—with the second guide roller not exerting an impulse on the saw blade, but rather merely resting against it by means of the prestressing force provided to assure a correspondingly good contact—does not require a large-diameter embodiment, but rather on the contrary, a relatively small-diameter embodiment for it appears to be useful in order to avoid unnecessarily taking up space.

In another embodiment, the second guide roller is bearing-mounted in an oscillating retainer that is bearing-mounted to, particularly in, the support frame so that it is able to move in an oscillating fashion. The support frame therefore has an oscillating retainer, in particular an oscillating retainer that is bearing-mounted between components of the support frame. The second guide roller is in turn bearing-mounted in this oscillating retainer. The second guide roller therefore has an axle or axial bearing that is situated in the oscillating retainer. The second guide roller oscillates together with the oscillating retainer, so to speak.

In another preferred embodiment, the oscillating retainer is bearing-mounted in oscillating fashion on the rotation axis of the first guide roller. The oscillating retainer and the first guide roller therefore have the same rotation axis or bearing axis. As a result, the position of the second guide roller, together with that of the oscillating retainer, changes around the rotation axis of the first guide roller. In this case, the prestressing of the second guide roller relative to the saw blade spine yields an arc-shaped oscillating motion around the rotation axis of the first guide roller. Incidentally, the embodiment is simple and inexpensive to manufacture since it is only necessary to take into account one rotation axis for both the first guide roller and the oscillating retainer.

In another embodiment, the oscillating retainer has two oscillating arms between which the first guide roller and/or the second guide roller is/are accommodated. The oscillating retainer is therefore embodied with two oscillating arms that laterally embrace the first guide roller and/or the second guide roller.

In another preferred embodiment, the two oscillating arms are each prestressed in the direction toward the saw blade spine. The above-described prestressing of the second guide element, in particular the second guide roller, is therefore produced through the prestressing of the two oscillating arms. The embodiment of the oscillating arm structure here permits a slight relative movement of the two oscillating arms in relation to each other so that suddenly occurring, uneven forces on the saw blade oriented away from the forward feed direction can be compensated for to a certain extent and the second guide element, which is bearing-mounted in these two oscillating arms, causes the saw blade to swing back into the desired position.

In another, quite particularly preferred embodiment, the prestressing is produced by means of a spring, in particular a helical compression spring. Helical compression springs are known and readily available in all possible embodiment forms. Through a suitable support on the support frame, the helical compression spring can easily produce the necessary amount of required prestressing in that one end of the helical compression spring rests against the oscillating arms and the other rests against the support frame, for example a projection of the support frame. The prestressing is thus very simple and inexpensive to produce; the prestressing can be eliminated, for example for maintenance purposes, by simply removing the helical compression spring. Preferably, the support frame has a travel limitation of the oscillating arms or else the oscillating arms themselves, through appropriate embodiment, have a travel limitation so as to limit the oscillation in such a way that in a state in which no (travel-limiting) saw blade is inserted, the helical compression spring cannot come out of its installed position.

Other advantageous embodiments ensue from the dependent claims and combinations thereof.

BRIEF DESCRIPTION OF THE DRAWINGS

FIG. 3 is a cross section through the support frame and the guide elements and
FIG. 4 shows an oscillating retainer that is prestressed in the support frame.

DETAILED DESCRIPTION OF THE PREFERRED EMBODIMENTS

Figure 1:
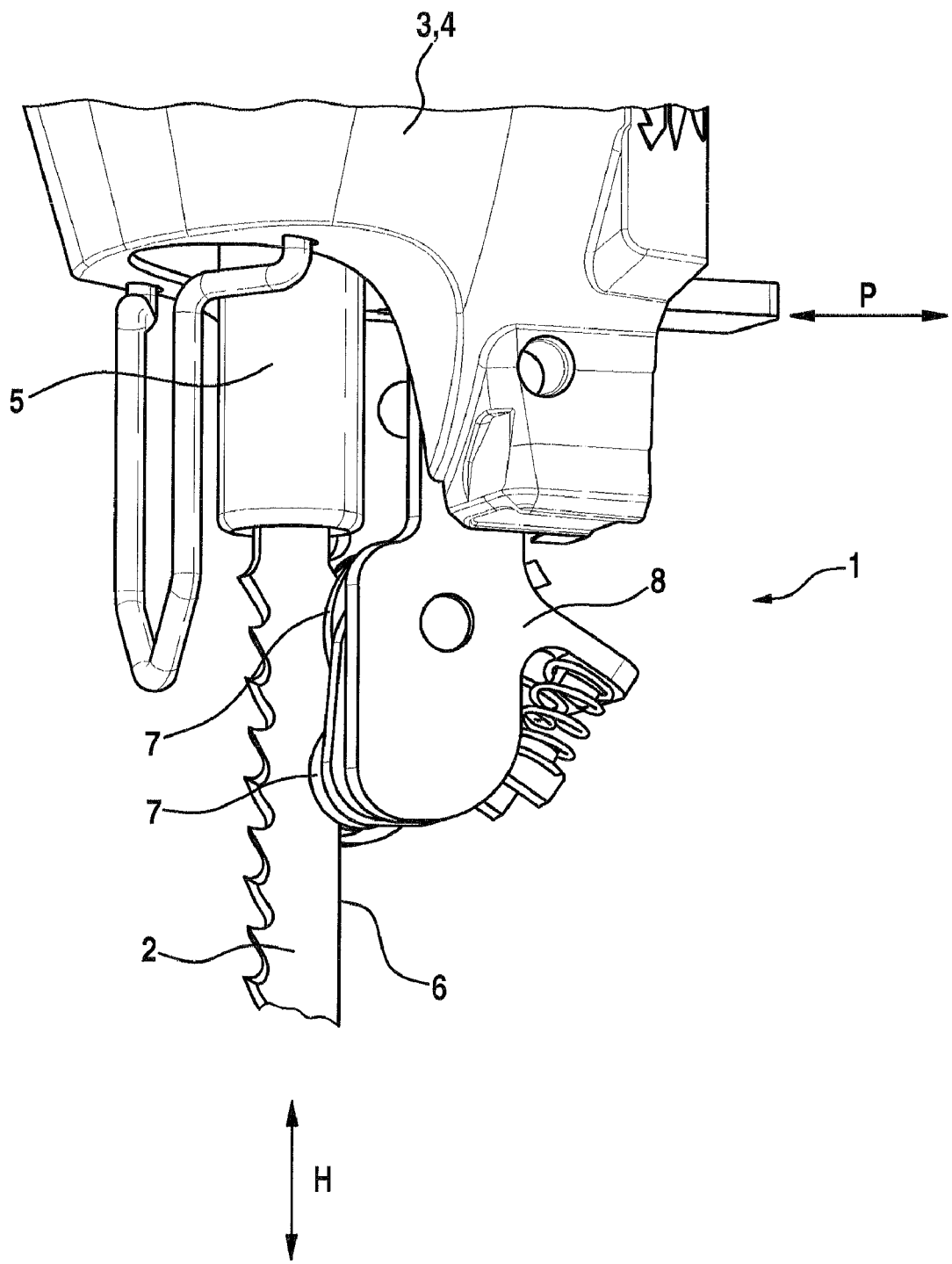
FIG. 1 shows a pendulum guide device of a power jigsaw.

FIG. 1 shows a pendulum guide device 1 for a saw blade 2 that executes reciprocating motions, which is part of an only partially depicted power jigsaw 3, in particular a jigsaw 4. The jigsaw 4 has a saw blade holder 5 for holding the saw blade 2; by means of a motor/transmission combination that is not shown, the saw blade holder 5 produces a reciprocating motion H of the saw blade 2. The reciprocating motion H, i.e. the vertical motion in the direction of the longitudinal span of the saw blade 2, is introduced by means of the saw blade holder 5. The pendulum guide device 1 is provided in order to introduce an oscillating motion so as to produce an oscillating saw cut—i.e. one in which in addition to its vertical reciprocating motion, the saw blade 2 is also moved back and forth in the forward feed direction so that a higher cutting speed can be achieved—and uses guide elements 7 to exert a guiding action on the saw blade spine 6 of the saw blade 2; in order to introduce the oscillating action, the pendulum guide device 1, in an oscillation introduction P, is moved back and forth in the forward feed direction and therefore transversely to the vertical reciprocating motion of the saw blade 2 by means of a support frame 8 accommodating the guide elements 7 so that the sum of the vertical reciprocating motion and the horizontal back and forth motion (the oscillation introduction P) of the saw blade 2 yields the oscillating/reciprocating motion for producing the oscillating cut. The oscillation introduction P is produced by means of the support frame 8 and at least one guide element 7 as part of an impulse transmission to the saw blade 2 by means of its saw blade spine 6. The oscillating/reciprocating motion that produces the oscillating cut results from the sum of the oscillation introduction P and the vertical reciprocating motion H.

Figure 2:
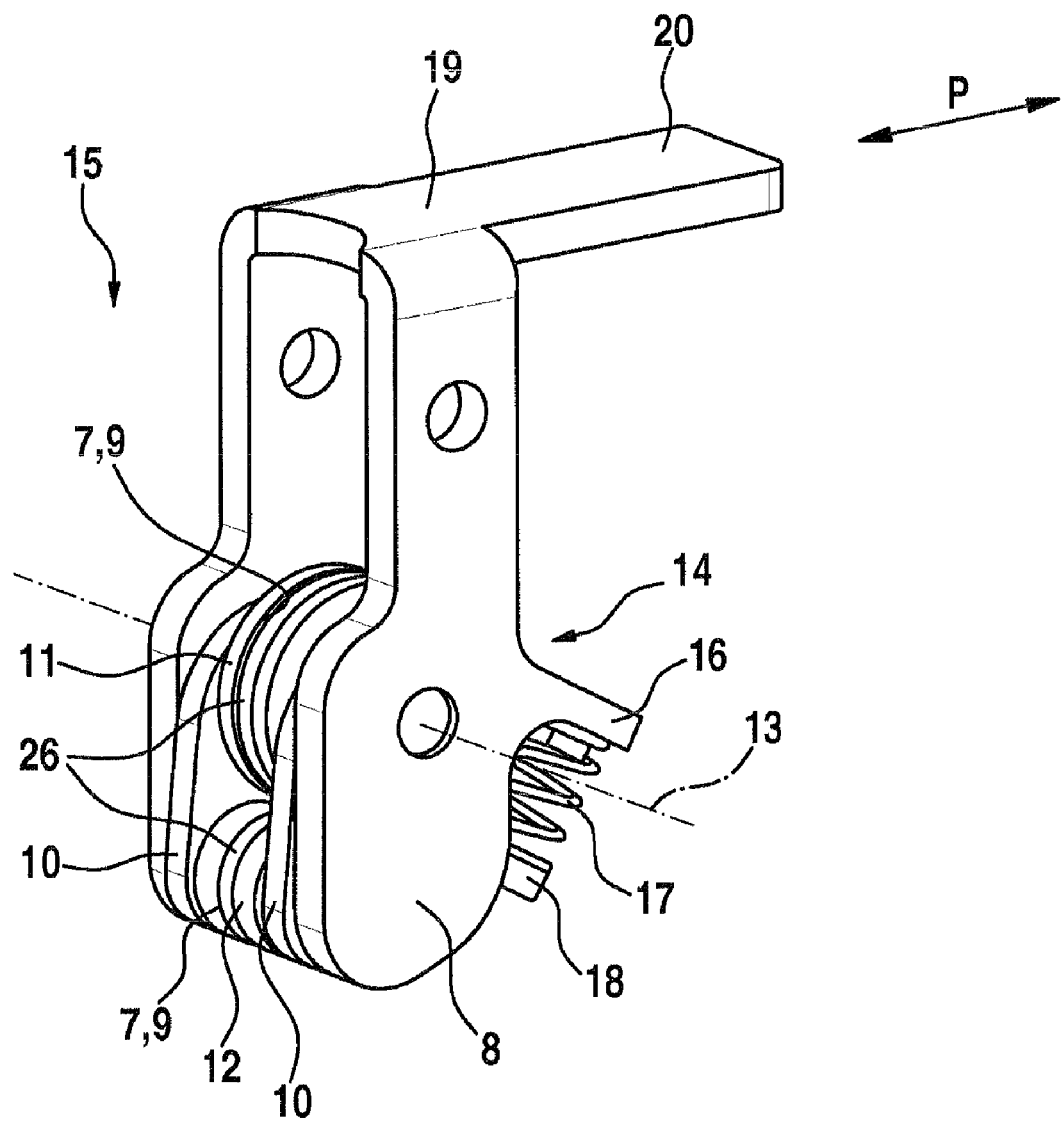
FIG. 2 shows a support frame of the pendulum guide device, with guide elements.

FIG. 2 shows the support frame 8 with guide elements 7 embodied in the form of guide rollers 9; the guide rollers 9 are situated inside the support frame 8 and inside an oscillating retainer 10 situated inside the support frame 8. The guide rollers 9 here are embodied in the form of an upper, first guide roller 11 and, situated below this, a lower, second guide roller 12. Both the first guide roller 11 and the second guide roller 12 are enclosed by an oscillating retainer 10. In this case, the second guide roller 12 is bearing-mounted in the oscillating retainer 10 while the first guide roller 11 and the oscillating retainer 10 are both bearing-mounted to the support frame 8. The first guide roller 11 and the oscillating retainer 10 therefore share a common bearing axis 13. The first guide roller 11 is significantly larger in diameter than the second guide roller 12. The outer circumference of both guide rollers 9 has an essentially V-shaped guide notch 26 in which the saw blade 2, not shown here, rests with its saw blade spine 6 (see FIG. 1).

The oscillating retainer 10, with the second guide roller 12 bearing-mounted in it, is bearing-mounted so that it is able to move in an oscillating fashion around the bearing axis 13. On its support frame back side 14, which is situated opposite from a support side 15 for the saw blade 2 that is not shown here (see FIG. 1), the support frame 8 has lever-shaped support points 16 that support one end of a helical compression spring 17; the second support point of the helical compression spring 17 is situated on a support lever 18 at the back end of the oscillating support 10, producing a prestressing of the second guide roller 12 relative to the saw blade 2, not shown here, in that the second guide roller 12 is pushed in relation to the first guide roller 11 around the bearing axis 13 in the direction toward the support side 15 of the support frame 8. The first guide roller 11 is therefore bearing-mounted in rotary fashion around the bearing axis 13 while the oscillating retainer 10 is bearing-mounted in the support frame 8 in oscillating fashion around the bearing axis 13. In order to carry out the oscillation introduction P, the support frame 8 has a receiving element 20 embodied in the form of a sort of knee lever 19, which is essentially oriented parallel to the movement of the oscillation introduction P. The receiving element 20 here can be adapted into any form that is suitable and required for the respective power jigsaw or can be embodied in a suitable, required form.

FIG. 3 shows a cross section through the support frame 8 at the level of the guide rollers 9. The guide rollers 9 are once again embodied in the form of a first guide roller 11 with a significantly larger diameter and a second guide roller 12 with a smaller diameter. The first guide roller 11 is mounted in rotary fashion around the bearing axis 13 by means of a bearing 21 embodied in the form of a needle bearing 22. The oscillating retainer 10 is bearing-mounted in pivoting fashion, likewise around the bearing axis 13, and is composed of two oscillating arms 23 that accommodate the guide rollers 9 between themselves. Because this is a cross-sectional depiction, only the one oscillating arm 23 is visible here, namely the oscillating arm 24 on the right with regard to the forward feed direction V. A guide roller bearing 25 is provided on the oscillating arms 23 so as to support the second guide roller 12 in a rotary fashion. The two oscillating arms 23 are bearing-mounted in pivoting fashion around the bearing axis 13 and constitute the oscillating retainer 10 on which the second guide roller 12 is rotatably mounted by means of the guide roller bearing 25. Each oscillating arm 23 has the support lever 18 that is situated on the back side of the oscillating retainer, i.e. on the side oriented away from the second guide roller 12, against which support lever the helical compression spring 17 rests in order to produce a prestressing in the forward feed direction V relative to the saw blade 2, not shown here; the other end of the helical compression spring 17 rests against the support point 16 embodied on the support frame back side 14. By means of the support lever 18, the helical compression spring 17 therefore produces a prestressing of the second guide roller 12 in the forward feed direction V relative to the first guide roller 11 fixed in place on the support frame. The guide rollers 9 are equipped with the essentially V-shaped guide notch 26. By means of the saw blade spine 6, the V-shaped guide notch 26 produces a centering of the saw blade 2, not shown here, even with different saw blade thicknesses or breadths. The V-shaped guide notch 26 achieves a restricted guidance of the saw blade 2, not shown, in the guide rollers 9, which centers the saw blade relative to the thickness of the guide rollers 9.

FIG. 4 depicts the pendulum guide device 1 in a perspective view from the rear, showing the support points 16 that are affixed to the support frame 8, the support levers 18 that are affixed, in particular integrally joined, to the oscillating arms 23, and the (right and left) helical compression springs 17 that are situated between these support points and support levers. A respective deflection limiter 27 is linked in lever fashion to the back of oscillating arms 23; above the support point 16 and prevents the oscillating retainer 10 composed of the oscillating arms 23 and the second guide roller 12 from executing an undesirably large amount of travel in the forward feed direction V induced by the helical compression spring 17 when the saw blade 2, not shown here, is not clamped in position. The helical compression springs 17 could in particular spring out in such a case, but the deflection limiters 27 prevent this from occurring.

What is claimed is:

1. A pendulum guide device for a power jigsaw saw blade that executes reciprocating motions, comprising:
    guide elements that engage a saw blade spine of the saw blade and are associated with a support frame,
    wherein the guide elements comprise at least two guide elements (7), wherein one of said at least two guide elements is fixed in place on the support frame and wherein the other of said at least two guide elements is bearing-mounted to the support frame (8) in moving fashion and is prestressed in the direction toward the saw blade spine (6),
    wherein the guide element (7) that is fixed in place on the support frame is a first guide roller (11), wherein the movably bearing-mounted guide element (7) is a second guide roller (12), and
    wherein the second guide roller (12) is bearing-mounted in an oscillating retainer (10) that is bearing-mounted to the support frame (8) so that it is moveable in an oscillating fashion on a rotation axis of the first guide roller; and
    at least one helical compression spring, wherein said at least one helical compression spring is configured to produce a prestressing, wherein said at least one helical compression spring rests with one end against the support frame and with another end against the oscillating retainer, whereby the support frame and the oscillating retainer provide a deflection limiter that limits an amount of travel of the oscillating retainer in a direction of the saw blade, such that an undesirably large amount of travel in the direction of the saw blade is prevented.

2. The pendulum guide device as recited in claim 1, wherein the guide element (7) that is fixed in place on the support frame is rotatably mounted to the support frame (8) by means of a bearing (21).

3. The pendulum guide device as recited in claim 2, wherein the bearing (21) is a needle bearing (22).

4. The pendulum guide device as recited in claim 1, wherein at least the second guide roller (12) has an essentially V-shaped guide notch (26) on its outer circumference.

5. The pendulum guide device as recited in claim 1, wherein the oscillating retainer (10) has two oscillating arms (23, 24) between which the first guide roller (11) and/or the second guide roller (12) is/are accommodated.

6. The pendulum guide device as recited in claim 5, wherein the two oscillating arms (23, 24) are each prestressed in the direction toward the saw blade spine (6).

\* \* \* \* \*